(12) United States Patent
Baker et al.

(10) Patent No.: US 6,594,735 B1
(45) Date of Patent: Jul. 15, 2003

(54) HIGH AVAILABILITY COMPUTING SYSTEM

(75) Inventors: Brian Baker, Dunrobin (CA); Terry E. Newell, Kanata (CA); Bing L. Wong, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,861

(22) Filed: Dec. 28, 1998

(51) Int. Cl.$^7$ .............................................. G06F 12/00

(52) U.S. Cl. ..................... 711/147; 711/152; 711/153

(58) Field of Search .................... 712/32, 114; 709/200, 709/201, 213–216, 245, 248; 711/1, 100, 147–153, 202, 203, 206, 209, 210; 707/8, 9, 200–203

(56) References Cited

U.S. PATENT DOCUMENTS

| | | | |
|---|---|---|---|
| 3,995,118 A | | 11/1976 | Chao ............................ 179/15 |
| 4,511,969 A | | 4/1985 | Koenig et al. ............... 364/200 |
| 4,654,788 A | | 3/1987 | Boudreau et al. ........... 364/200 |
| 4,672,537 A | | 6/1987 | Katzman et al. ............. 364/200 |
| 5,086,429 A | | 2/1992 | Gray et al. .................... 371/9.1 |
| 5,146,565 A | * | 9/1992 | Blanck et al. ................. 710/36 |
| 5,177,747 A | | 1/1993 | Capps, Jr. et al. .......... 371/51.1 |
| 5,327,550 A | | 7/1994 | Pribnow ....................... 395/575 |
| 5,515,523 A | | 5/1996 | Kalkunte et al. ............ 395/476 |
| 5,752,077 A | | 5/1998 | Yiu et al. ..................... 395/827 |
| 5,819,061 A | * | 10/1998 | Glassen et al. ................. 709/1 |
| 5,909,574 A | * | 6/1999 | Meyer ......................... 712/244 |
| 6,032,232 A | | 2/2000 | Lindeborg et al. ........... 711/149 |
| 6,105,113 A | * | 8/2000 | Schimmel ................... 711/146 |

OTHER PUBLICATIONS

IBM Corporation, "Reliability in Multiprocessors Through Swapping Status of a Failing CPU Alternately With Status of Non Failing CPU", IBM Technical Disclosure Bulletin, vol. 14, Issue No. 7, Dec. 1, 1971, 3 pages.

* cited by examiner

Primary Examiner—John F. Niebling
Assistant Examiner—Stacy A Whitmore

(57) ABSTRACT

A high availability computing system having multiple processing elements capable of simultaneous execution of multiple software programs and seamless software upgrades is disclosed. The system comprises multiple processing elements, each processing element capable of accessing memory at processing element memory addresses; and multiple memory modules each having a plurality of alterable memory units, each memory unit identified by a system memory address within a defined address space. The system further includes a memory element interface in communication with each of the memory elements permitting alteration of the defined address space for the memory element. An address mapper is interconnected between each of the processing elements and at least one of the memory elements. The address mapper is capable of mapping a processing element memory address to a global memory address within a defined address space. Thus, the system may allocate memory addresses used by a single one of the memory elements to an address space used by only a single processing element. The system further has access ports to each of the memory elements, thus allowing the single processing element limited access to other memory modules. Conversely, other processing elements may have limited access to the single memory module. As a result, the single computing system may be divided into two logical computing systems. Software upgrades may be loaded into one system, without interrupting the other system.

15 Claims, 12 Drawing Sheets

HIGH AVAILABILITY COMPUTING SYSTEM

FIELD OF THE INVENTION

The present invention relates to computing systems, and more particularly to a high availability computing system having multiple processing elements capable of simultaneous execution of multiple software programs and seamless software upgrades.

BACKGROUND OF THE INVENTION

Conventional computing devices typically comprise a single central processing unit, interconnected with a single memory.

As computing demands have grown, demand for multi-processor systems has been created. A multi-processor system may execute program processes simultaneously across processors. However, multi-processor systems are very susceptible to faults in memory that is shared among the processes and processors ("shared memory"). As the shared memory is used by all processes and processors, failure of shared memory may cause failure of the entire computing system. Certain applications such as, for example, telephony switches, require extremely high availability and hence fault tolerance. A computing system offering such fault tolerance is disclosed in U.S. patent application Ser. No. 08/997,776, the contents of which are hereby incorporated by reference.

In addition to requiring fault tolerance, it may be necessary to upgrade system software from one release to the next, from time to time. In order to further achieve a high availability system, it should be possible to effect such software upgrade without significant system downtime. Accordingly, it would be beneficial if the system could execute both old and new software images simultaneously and independently to allow seamless upgrading of software.

In the past software upgrades in two processor, redundant systems have been effected by physically separating two processors operating in redundancy and associated memory, and running both with independent software loads. This facilitated the transfer of necessary operational data so that a first upgraded processor could be brought to a fully operational state while a second processor carried the processing load using old (ie. not upgraded) software. At the completion of the software upgrade of the first processor, the incoming data could be processed by the first processor running the upgraded software and the second processor could be upgraded. Once both processors were upgraded, both processors could again operate in redundancy. This approach, however, was limited to systems with two processors operating in redundancy.

Accordingly, a method and system allowing the simultaneous execution of two independent software systems on a multi-processor computing system, thereby facilitating software upgrades is desirable.

SUMMARY OF THE INVENTION

The present invention allows the separation of a computing system having at least two processing elements, and at least two memory elements into multiple logical systems. Each logical system may execute different software. Separation is accomplished by using processing elements that address memory at processor memory addresses, within a global address space. Memory elements, forming part of the system are configurable to span memory addresses within the global address space. The system may be configured into multiple logical systems by configuring one memory element to occupy address space within the global address space not used by a first of the processing elements, and configuring the another processing element to use the global address space now occupied by the configured memory element. To isolate memory elements, access to the first memory element by the second processor is limited. Two logical systems are thus formed.

Preferably, processing element memory addresses are mapped to global memory addresses by way of a configurable address mapper forming part of each processing module. Memory elements are configurable to occupy specific global addresses, by way of a memory interface. Access to memory modules may be effected by way of transactions contained in frames exchanged between processing elements and memory elements. Ports on the memory elements may be used to limit access to elements, thereby limiting access to, and isolating memory elements.

Advantageously, once a system has been separated, independent software loads may execute on the two logical systems, allowing for upgraded software to be loaded and executed on one of the two logical systems. The separated systems may then be re-combined; control of the re-combined system may be transferred to the upgraded software, thereby allowing upgrading of software executing on the original system.

BRIEF DESCRIPTION OF THE DRAWING

In figures which illustrate, by way of example, embodiments of the present invention.

DETAILED DESCRIPTION

Figure 1:
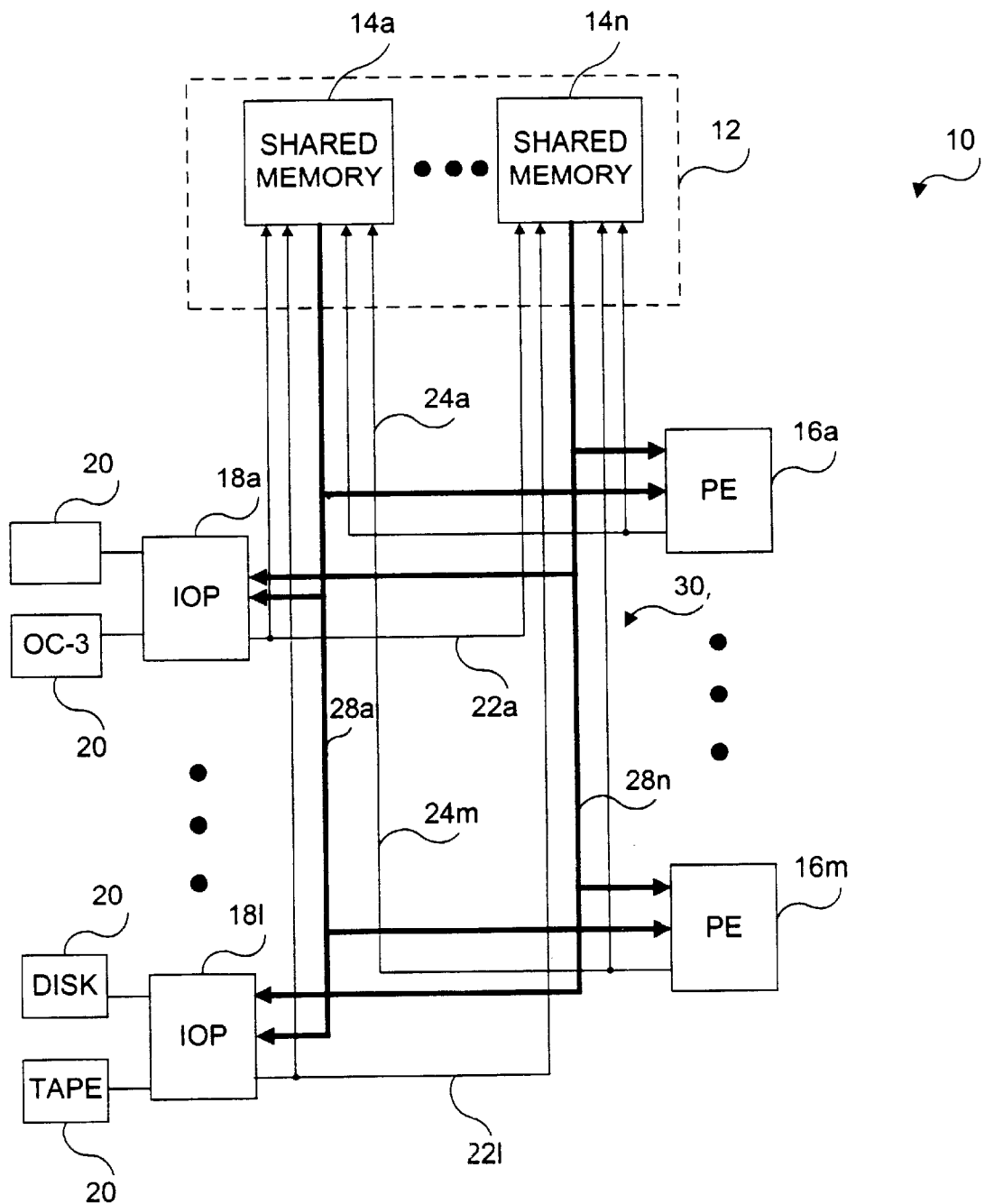
FIG. 1 is a block diagram of a multi-processor, shared memory computing system exemplary of a preferred embodiment of the present invention.

FIG. 1 illustrates the architecture of a multi-processor, shared memory computing system 10, exemplary of a preferred embodiment of the present invention. System 10 comprises shared memory 12 which in turn comprises a plurality of shared memory elements, in the form of modules 14a to 14n (collectively and individually 14). Each memory element 14 has a plurality of alterable memory units. Interconnected with shared memory 12 are a plurality of processing elements ("PE"s) 16a to 16m (collectively and individually 16) and a plurality of input/output processors ("IOP"s) 18a to 18l (collectively and individually 18). Connected to each IOP 18 is one or more input/output peripherals 20. Such peripherals may include disk and tape storage devices or communications interfaces such as optical OC3 interfaces.

The architecture of system 10 allows scalable processing using one or any other number of PEs 16, limited by the number of slots physically available in a housing for system 10. System 10 may be re-configured simply by inserting a further PE 16. Input/output is similarly scalable and accomplished by inserting more IOPs 18 into system 10. Finally, memory of system 10 is expandable by increasing shared memory 12 by inserting one or more shared memory modules 14 up to the limit of physically available slots, or by increasing the memory capacity of each PE 16. In the preferred embodiment up to ten memory modules 14 may form part of the system, and a maximum of sixteen PEs 16 and IOPs 18 may form part of system 10.

Additionally, the architecture allows for hardware sparing. More specifically, N+M sparing may be accomplished. That is, for computing capacity that may be met by N active PEs 16, IOPs 18 or shared memory modules 14, M additionally spare redundant modules may be included. In the event one of the modules fails, it may be removed from the system without affecting overall system performance, provided no more than M modules fail.

In the preferred embodiment, shared memory 12, PEs 16 and IOPs 18 are interconnected by a set of communication links collectively referred to as an extended architecture interconnect 30 ("XAI"). Physically, the XAI 30 comprises links 22a to 22l (individually and collectively referred to as 22); 24a to 24m (individually and collectively referred to as 24); and 28a to 28n (individually and collectively referred to as 28). These are unidirectional point to multi-point links. Preferably these are serial links. Physically, links 24 and 28 are preferably identical.

Each IOP 18 and PE 16 is interconnected with each shared memory module 14 by one of links 22 and 24, respectively. These links allow a serial transfer of data from IOPs 18 to shared memory modules 14 and PEs 16 to shared memory modules 14. Each IOP 18 or PE 16 broadcasts all of its outgoing data on one associated link 22 or 24. Each link 22 or 24 is interconnected with each shared memory module 14. Thus, all data broadcast by a single IOP 18 or PE 16 is received by all shared memory modules 14.

Each shared memory module 14 is further interconnected with each PE 16 and IOP 18 by a serial link 28. Each of these serial links 28 allows a serial transfer of data from a shared memory module 14 to all IOPs 18 and PEs 16.

Data is transferred between PEs, IOPs and shared memory modules, 16, 18, and 14 respectively, in frames, transferred on links 22, 24 and 28. Each frame consists of a stream of bits of data, arranged in a defined format. Broadly, frames used by system 10 may be categorized as request, response and acknowledge frames. Each frame contains a three bit identifier, used to identify that frame as a request, response or acknowledge frame. Groups of frames are used to complete transactions between modules 16, 18 and 14, as detailed below.

Hardware within sharded memory modules, PEs and IOPs, 14, 16 and 18 may be programmed by way of hardware registers, in order to configure the shared memory, PEs and IOPs 14, 16 and 18. Hardware registers are addressable within the address space occupied by the shared memory, PEs and IOPs, 14, 16 and 18 using register request frames.

Figure 2:
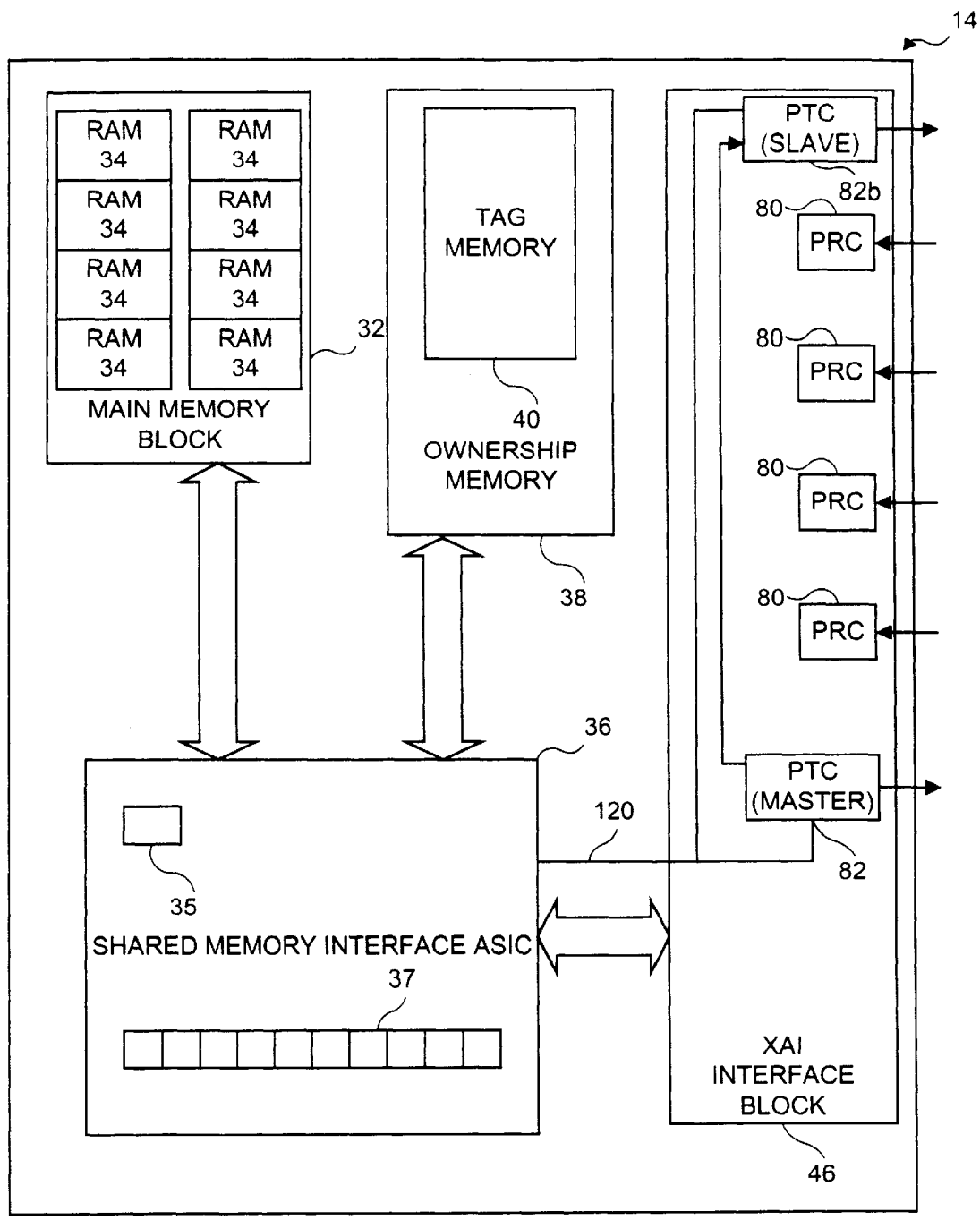
FIG. 2 is a block diagram of a shared memory module of the system of FIG.1.

FIG. 2 illustrates the architecture of each shared memory module 14. Specifically, each memory module 14 comprises a main memory block 32 which, in turn, comprises up to eight synchronous random access memory ("RAM") hybrids 34 that provide main program and data storage for the shared memory module 14. The size of memory for system 10 is dependent on the capacity of memory block 32 of the shared memory modules 14. This capacity may vary from shared memory module to shared memory module.

At the heart of each shared memory module 14 is a shared memory interface 36. Shared memory interface 36 is preferably an application specific integrated circuit ("ASIC") and acts as a memory controller and port controller for memory modules 14. Further connected to shared memory interface 36 is ownership memory block 38. Ownership memory block 38 includes tag memory 40. Tag memory 40 is used by shared memory module 14 to store information identifying the present state of each group of thirty-two memory locations within main memory block 32 with respect to the check point and roll-back strategies as disclosed in U.S. patent application Ser. No. 08/774,548, the contents of which are hereby incorporated by reference. As disclosed in that application, the data within tag memory 40 includes information concerning whether a group of memory locations is currently in use by a software task and, if so, the identifier of that task. If memory locations are in use by an executing task, they may be be "owned" by the executing task. If memory is "owned" it cannot be modified by other tasks executing on the system. The information further identifies whether or not the data in the group has been modified since the last check point. Tag memory 40 is used and updated by the check point and data ownership state machines of the shared memory interface 36 as disclosed in that application each time memory block 32 is accessed. This memory ownership and roll-back scheme allows restoration of shared memory in the event a process responsible for its modification fails before completion.

Also forming part of shared memory interface 36 is receive port block 37 and transmit port 35. Receive port block 37 comprises a plurality of receive ports from an XAI link to shared memory interface 36, each of which is physically and logically isolated from the other, and serves as the access point for receipt of data from interconnected modules by shared memory interface 36. Each receive port is associated with a single XAI link 24. similarly, a transmit port 35 forms part of shared memory interface 36 and allows for the provision of data from shared memory interface 36. The transmit port 35 is associated with a single logical XAI link 28. Each logical XAI link 28, actually comprises two physical links, one used to transmit to half the PEs, the other to transmit to the other half of the PEs. Each physical link is interconnected with one of pulse transmitters ("PTC"s) 82 or 82b. Each port is a termination on a module of a connection to or from another module.

Each receive port is controllable to assume any combination of a number of states, thereby allowing receipt of only certain types of frames, from interconnected PEs or IOPs.

Specifically, each receive port may assume none or any of the following states, in any combination:

NRRE—("Normal Mode Register Request Enable") allows register request frames to be received by a port;

NRAE—("Normal Mode Response and Acknowledge Enable") —allows both memory and register response and acknowledge frames to be received when in normal operating mode;

FRRE—("Firewall Register Request Enable") allows register request frames to be received by the port when the port is blocked as result of a hardware fault;

FRAE—("Firewall Response and Acknowledge Enable") allows memory and register response and acknowledge frames to be received by the port when the port is blocked as result of a hardware fault;

NMRE—allows memory read, and write requests when in normal mode;

WE—("Write Enable") allows write requests to memory and registers to be accepted;

MOE—("Memory Ownership Enable") when enabled allows both memory and register read and write requests, with ownership (for memory) and when disabled, allows only memory reads (without ownership) and register read requests.

These states may limit or allow access to a memory module 14, thereby effectively isolating another module interconnected with the port, based on the state of the port, as disclosed in U.S. patent application Ser. No. 08/997,776. Upon failure of a module, registers of a failed module may be accessed by causing modules to assume the FRRE or FRAE states, outlined above. Access through a port is effected by each shared memory interface 36, comparing identifier bits within a transmitted frame to determine the frame type, and compare the frame type to permitted frames. Shared memory interface 36 may, under software control of maintenance software described below, vary the state of each port. As noted, each port is a physical port formed on shared memory interface 36. However, a person skilled in the art will appreciate that the ports need not be physical ports, but instead could be logical ports. Moreover, the ports need not be formed as part of the shared memory interface 36.

Interconnected to receive port block 37 and transmit port 35 of shared memory interface 36 is an XAI interface block 46. Preferably, the XAI interface block 46 is formed from one or more ASICs. XAI interface block 46 provides the physical link between shared memory module 14 and the XAI 30.

Figure 3:
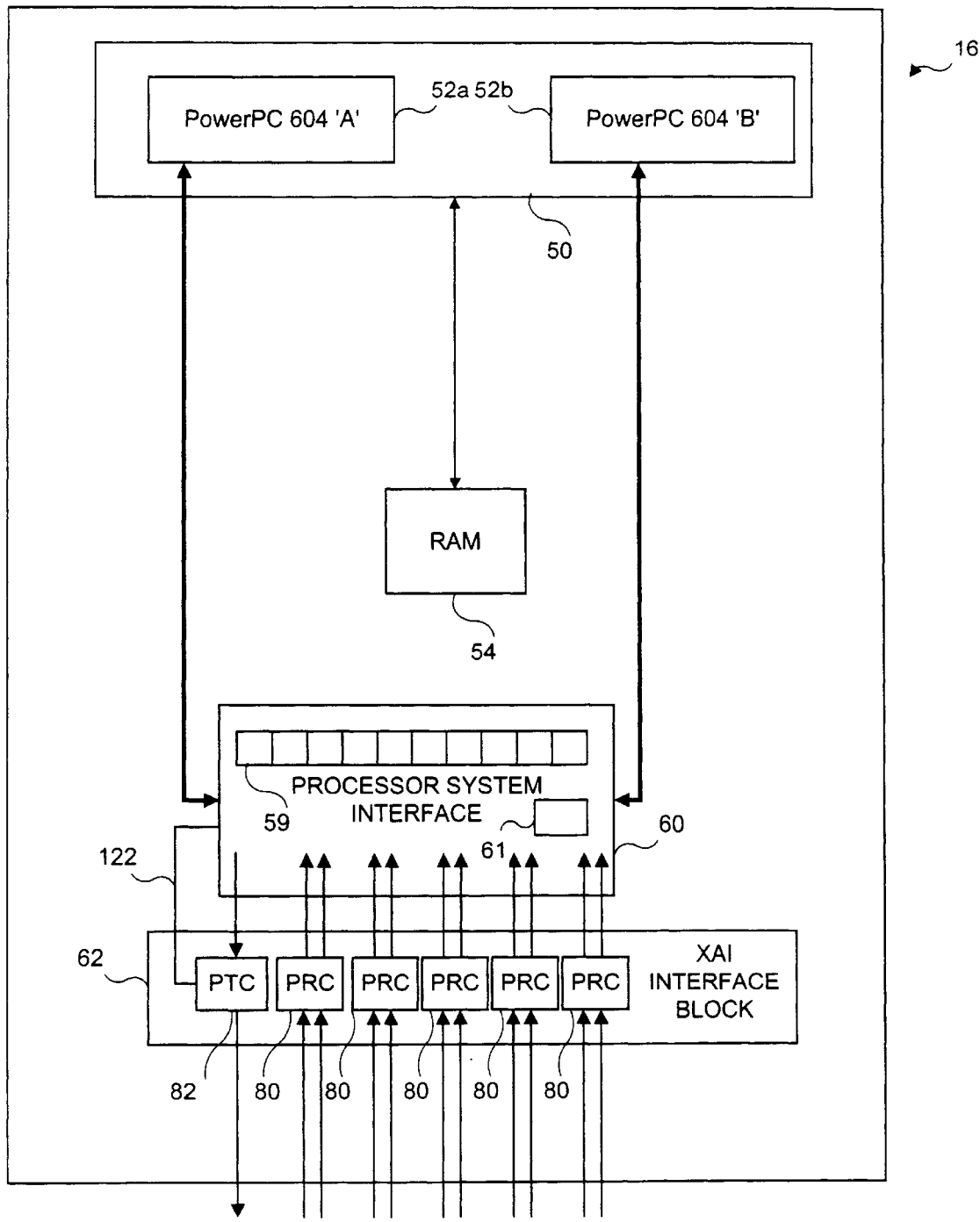
FIG. 3 is a block diagram of a processing element of the system of FIG. 1.

FIG. 3. illustrates the architecture of each PE 16. PEs 16 provide system 10 with multiple spared, fault detecting computing engines each operating in a symmetric multi-processing environment. Each PE 16 maintains an independent service state during operation so that each PE may be individually replaced or upgraded without the need to replace any other hardware and without causing any other interruption to the system. Each PE 16 comprises a processor block 50. Each processor block 50 comprises two microprocessors as central processing units ("CPUs") 52*a* and 52*b*. CPUs 52*a* and 52*b* are preferably MOTOROLA or IBM POWERPC processors. RAM 54 is interconnected with block 50 and provides fast local access by processors 52*a* and 52*b* to a copy of a program used to control operation of processor block 50, and overall control of system 10. CPUs 52*a* and 52*b* operate in synchronous lock-step with comparisons of their outputs to enable comprehensive fault detection.

Additionally, interconnected to processor block 50 is a processor system interface 60. Processor system interface 60 is also formed as an ASIC. Processor system interface 60 provides the physical interface for PE 16 to the XAI 30 (FIG. 1). Forming part of processor system interface 60 is a data receive port block 59 and a transmit port 61. Receive port block 59 provides a plurality of input ports, each of which is physically and logically isolated from the other. These serve as the access points for receipt of data from interconnected modules by processor system interface 60. Similarly, a transmit port 60 forms part of processor system interface 36 and allows for the provision of data to shared memory interface 36 by way of the XAI.

As with receive ports of memory modules 14 (FIG. 2) each PE receive port may assume none, or one or more states, allowing PE to receive various types of frames from an associated memory module interconnected with the port. Specifically PE receive ports may assume the following states, in any combination:

NRRE—("Normal Mode Register Request Enable") allows register request frames to be received by a port;

NRAE—("Normal Response and Acknowledge Enable") allows response and acknowledge frames to be received when in normal operating mode;

FRRE—("Firewall Register Request Enable") allows request frames to be received by the port in the presence of a hardware failure; and FRAE—("Firewall Response and Acknowledge Enable") allows the receipt of response and acknowledge frames in the presence of a hardware failure;

Interconnected with receive port block 59 and transmit port 61 of each processor system interface 60 is an XAI interface block 62. XAI interface block 62 is substantially identical to XAI interface block 46 of shared memory modules 14 depicted in FIG. 2. XAI interface block 62 provides the physical interface between each PE 16 and the XAI through receive port block 59 and transmit port 61.

The architecture of each IOP 18 (FIG. 1) is not illustrated. Ultimately, each IOP provides a standard PCI interface to system 10 for interconnection to a PCI bus based peripheral, such as for example a standard serial interface; an optical (OC3) interface; a SCSI hard disk drive; DAT drive; or the like. Each IOP also comprises a processor system interface and XAI interface block that are substantially similar to the processor system interface 60 and XAI interface block 62 forming part of PEs 16.

XAI interface blocks 46 and 62 are illustrated in FIGS. 2 and 3. Each comprises a plurality of pulse receivers ("PRC"s) 80 and at least one PTCs 82 and 82*b* (see FIG. 2). PTCs 82 and 82*b* package data received from shared memory interface 36 or processor system interface 60 and broadcast this data on the XAI 30. PRCs 80 receive the transmitted data, and "unpackage" the data to provide it to an interconnected processor system interface 60 or shared memory interface 36.

Specifically, PRCs 80 of PEs 14 and IOPs 18 receive data from the XAI 30 originating at PTCs 82 or 82*b* of shared memory modules 14. Similarly PRCs 80 of shared memory 14 receive data from the XAI 30 originating at PTCs 82 of PEs 14 and IOPs 18. PTCs 82 of IOPs 18 and PEs 16 package data received from interconnected processor system interface 60 and broadcast this packaged data on the XAI links 22 or 24 to shared memory 12. Each PTC 82 broadcasts data to one PRC 80 of each shared memory module 14. Physically, shared memory 12 is located in the centre of system 10. In order to transmit outgoing data from shared memory module 14 to all PEs 16 and IOPs 18 (FIG. 1), PTC 82 has mirrored physical outputs at slave PTC 82*b*. One set of PTC outputs transmits to all PBS 16 and IOPs 18 to the left of the shared memory module, while the other transmits to PEs 16 and IOPs 18 located to the right of the shared memory module.

Figure 4:
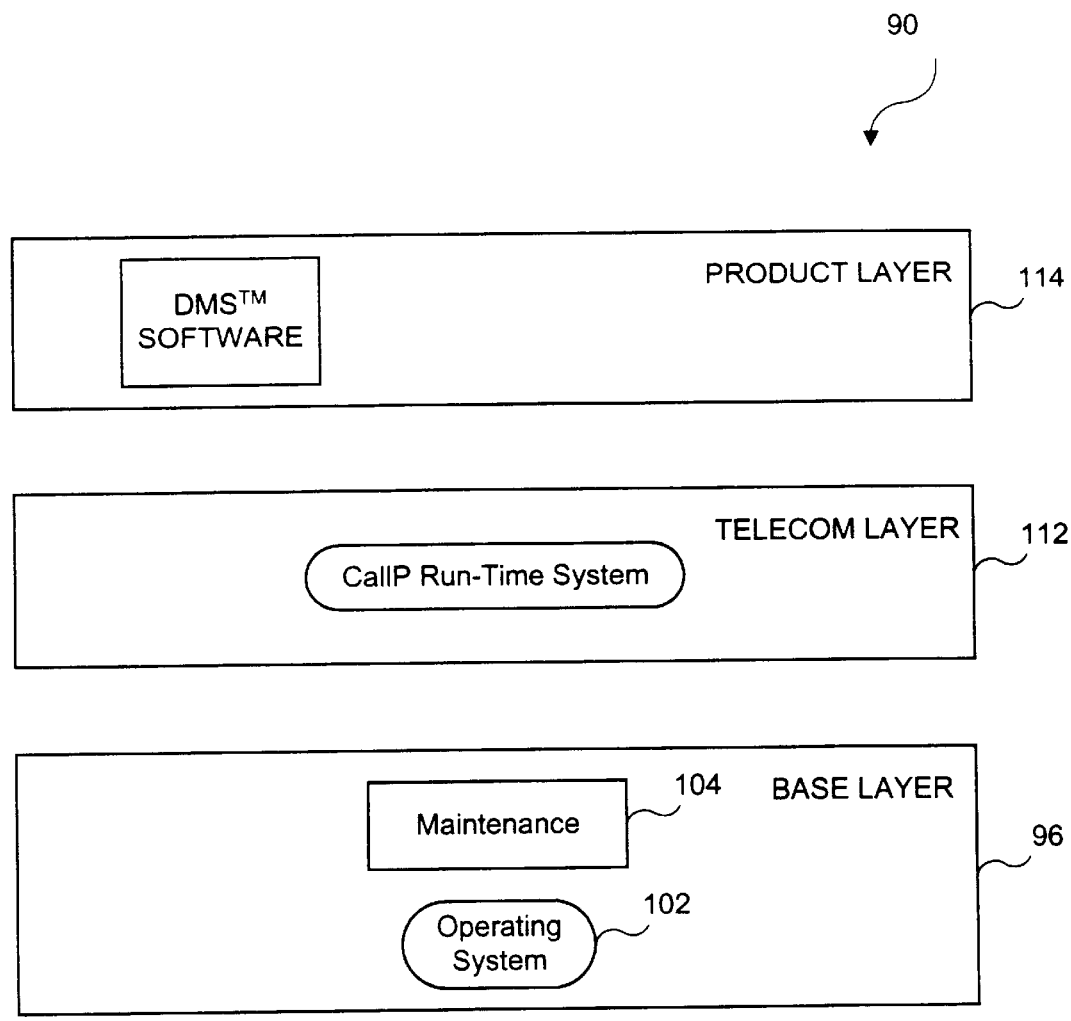
FIG. 4 is a block diagram of exemplary software forming part of the system of FIG. 1.

An example architecture of the software used in system 10 is illustrated in FIG. 4 and marked generally 90. Specifically, software system 90 comprises a base layer 96 that interfaces with the hardware of system 10 and includes an operating system 102 and maintenance software 104. Ultimately, these support product layer 114 and telecom layer 112, that allow system 10 to act as a telecommunications switch.

Identical copies of the program portion of software system 90 are stored in RAM 54 of each PE 16. Simultaneously running copies of the program portion of the software system arbitrate overall system co-ordination and scheduling of processing using shared memory 12.

Access between PEs, IOPs and shared memory modules 14, 16 and 18 is accomplished by initiating and completing transactions between modules transferred on XAI 30. Each transaction requires sending frames of data across one or more links 22, 24 and 28. The flow of read and write transactions between PEs 16 and shared memory modules is illustrated in FIGS. 5 and 6.

Figure 5:
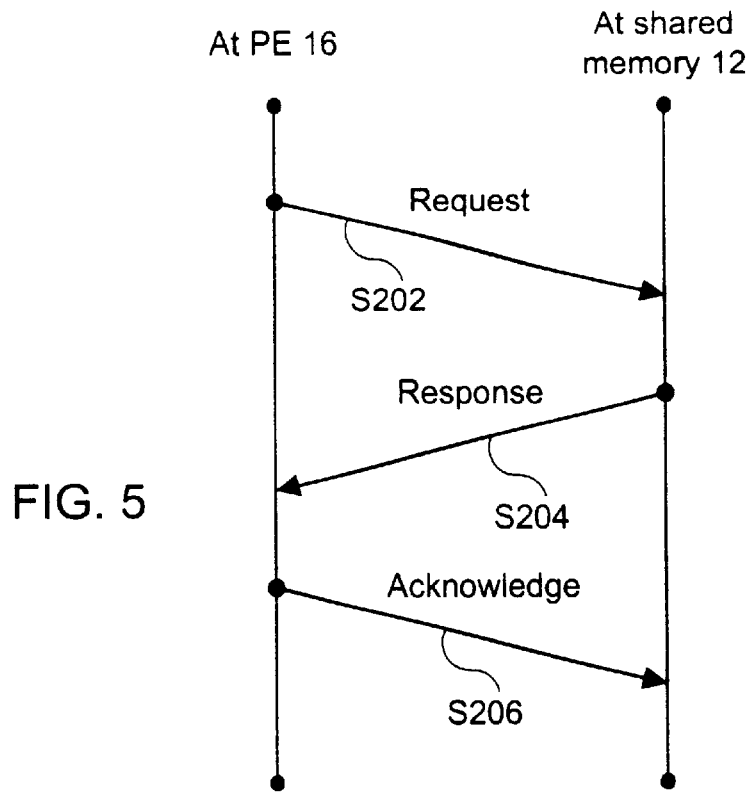
FIG. 5 schematically illustrates a memory read transaction, occurring on the system of FIG. 1.
Figure 6:
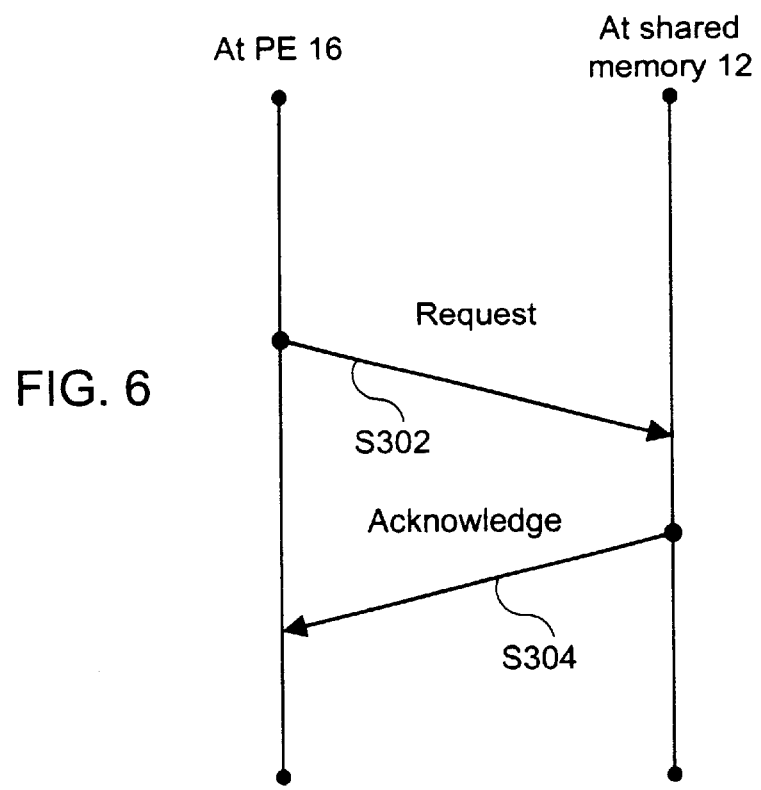
FIG. 6 schematically illustrates a memory write transaction, occurring on the system of FIG. 1.

As illustrated in FIG. 5, a read transaction is initiated by a PE 16, for example PE 16a. Processor system interface 60 of PE 16a generates a request frame consisting of a request type; a memory address; a sequence number; and a source identifier identifying the originating PE 16a. This frame is transferred to interconnected PTC 82, packaged and broadcast to all shared memory modules 14 on example link 24a (step S202).

At each of shared memory modules 14, the broadcast frame is received at a single PRC 80 connected to link 22a. At the PRC 80 of the shared memory interface 36 of memory modules 14, the frame type is examined. For ports at which a frame is received, that are configured to receive the particular frame type, the frames are processed. At ports for which the ports are configured to ignore the frame types, the frames are discarded. Thereafter, at ports configured to accept the frames, the frame is "unpackaged" at the PRC 80 and shared memory interface 36 of memory modules 14 screens the frame and analyzes the accompanying read address. The shared memory interface 36 uses the read memory address to determine whether or not a particular frame is destined for a particular shared memory module 14. Specifically, shared memory interface 36 of all memory modules 14 receive the frame and compare the address of the transaction to addresses to which the shared memory module is programmed to respond. If a frame is not intended for a recipient module, it is simply discarded at the shared memory interface 36 of the recipient module 14. Typically, two or more shared memory modules 14 operate in redundancy. As such, more than a single module will be programmed to respond to a particular single address and therefore respond to the read request in step S204.

Shared memory interfaces 36 of memory modules 14 that are programmed to respond to the memory address form appropriate response frames. Each memory module 14, preferably spans a contiguous memory space within a global addresses space.

Memory modules not programmed to respond, re-transmit the request frame on their transmit ports, thereby passing the request to PEs 16. This allows one PE to send requests, and more particularly, register requests to another PE. Response and acknowledge frames may similarly be exchanged by PEs: one PE originates a response, or acknowledge frame that is not processed by a receiving shared memory module, and re-transmitted by that module to other interconnected PEs.

Response frames contain the data requested; the sequence number from the request; an identifier of the responding memory module; a destination identifier formed from the source identifier of the request frame; and a status indicator. The response frame is passed by shared memory interface 36 to PTCs 82 and 82b of the responding shared memory module 14 (step S204). Additionally, each shared memory interface of a responding memory module 14 buffers the response frame until an acknowledge frame is received from the initiating PE (step S206).

All PEs 16 receive a response frame from one responding shared memory module 14 at one PRC 80. Again for ports configured to allow receipt of response frames, the frames are further processed. In the event multiple shared memory modules respond, a response frame is received at multiple PRCs of each PE. The PRCs unpackage the response frame and pass the data contained in the frame to the processor system interfaces of the PEs. IOPs 18 similarly receive data in the frame. Processor system interfaces 60 of all PEs 16 compare the destination identifier in the response frame to an identifier of the PE. The processor system interface 60 of all PEs 16 except the processor system interface of the transaction originating PE discard the received response frames. Ultimately, the processor system interface 60 of the PE 16 that originated the request returns the data to associated on-board CPUs 52a and 52b. Once a response frame is received, the PE sends an acknowledge frame back to the shared memory modules. When the responding shared memory module(s) 14, receive the acknowledge frame, they discard the buffered response frame.

As illustrated in FIG. 6, a memory write transaction is initiated by a PE 16. An originating PE transmits a request frame containing a request type; an address; data; a sequence number; and a source identifier, identifying the PE. Again this frame is broadcast to all shared memory modules on one of links 24 (step S302). Only ports configured to allow receipt of request frames further process the request frames. Only memory modules programmed to respond to a global address specified in the request frame, process the request. Again, memory modules not programmed to respond, re-transmit the request frame on their transmit ports, thereby passing the request to PEs 16. This allows one PE to send write requests, and more particularly, register write requests to another PE.

If memory modules are working in redundancy, multiple modules will respond to the request. The responding modules write data to the specified global memory addresses. Thereafter, the memory modules broadcast an acknowledge frame containing the sequence number of the request, and an identifier, identifying the shared memory module. Again, this acknowledge frame is broadcast to all PEs 16 on one of the links 28 (step S304). When the originating PE receives the acknowledge frame, it discards the write request frame.

While transaction frames are not being sent between PEs, IOPs 18, and shared memory modules, PTCs 82 and 82b of XAI interface blocks 46, 62 and 64 generate and broadcast idle codes on links 22, 24 and 28 that are used to inhibit access between modules in the event of module failures, as detailed in U.S. patent application Ser. No. 08/997,776. Upon detecting a failure, memory controllers 36 change the state of receive ports to restrict any access by a failed PE or IOP, by disabling the NRRE and NRAE states. Similarly, failure of a memory module will result in access restrictions at receive ports interconnected with the failed memory module. Temporary access to a failed module may be provided by way of the FRRE and FRAE states. Specifically, ports interconnected with a failed module temporarily assume the FRRE and/or FRAE state to mirror previous NRRE and NRAE states, thereby allowing limited diagnostics to be performed by other modules that may examine registers on the failed module. If a module is successfully diagnosed, previous NRRE and NRAE states may be restored. If a module cannot be diagnosed by maintenance software 104, the module is disabled.

In the preferred embodiment, shared memory interfaces 36 of each memory module 14 (FIG. 3) use a forty bit address space, while processors 52a and 52b use a thirty two bit address space. Shared memory 12 may thus be split into two distinct address spaces: one global shared forty bit address space and thirty-two bit PE address sub-spaces. This facilitates eventual system expansion to processors having address spaces larger than thirty-two bits, and to allow multiple processors to access mutually exclusive regions of shared memory, having identical processor addresses. Mapping between PE address space and global shared memory address space is effected by processor system interface 60 of each PE 16, as more particularly illustrated in FIG. 7.

Figure 7:
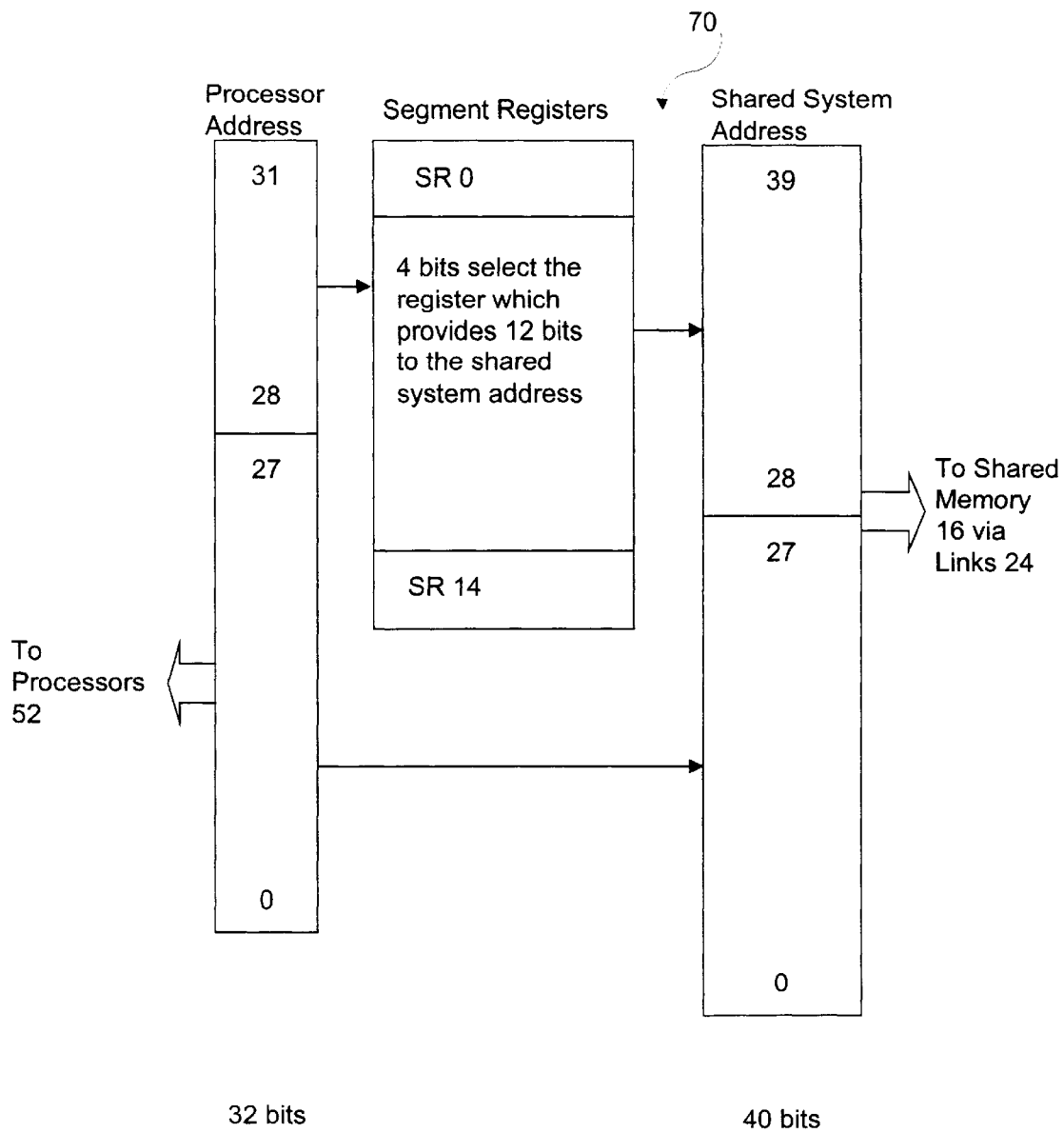
FIG. 7 illustrates an address mapper, mapping processor memory addresses to global memory addresses.

Specifically, within each processor system interface 60 is a address mapper 70 shown in FIG. 3 and schematically illustrated in FIG. 7. Segment memory address mapper 70 maps the local thirty-two bit address space used by processor block 50 of a PE to a global forty bit address used by memory module 14 (FIGS. 1 and 3). As illustrated, the top four bits of the processor address bus/space are used to select one of fourteen twelve bit segment registers. Segment memory address mapper 70 forms the forty bit global memory address used by PEs 16 from the low order twenty-eight (28) bits from the incoming processor supplied address and twelve bits from a selected segment register.

Each memory controller comprises fourteen segment registers (not shown) that may be loaded with segment addresses by maintenance or operating system software. These segment registers are used to select which 256 Mbyte ($2^{28}$ bytes) segment of global memory address space each PE addresses, at any time. Conveniently, the fourteen segment registers are pre-loaded, so that each of the fourteen segment registers in combination with the remaining twenty-eight address bits may be used to span one-sixteenth of the processor address space used by a PE. A person skilled in the art will appreciate that the chosen segment size is somewhat arbitrary, and convenient for the chosen POWERPC processors 52a and 52b.

In the preferred embodiment, the processor address that would otherwise identify the a top segment register, is used by the PEs to address 256 KBytes of hardware registers within the PE. As a result one of a possible sixteen segment registers is not available for this mapping. Another fifteenth segment register is used to provide an access window from the local image in one shared memory to the other image in a read-only mode. This facilitates the transfer of data between the two logical systems while preventing accidental overwrite of one system by the other. The segment registers are programmed to point to the correct portion of the other image in order to perform the read. This fifteenth segment register is altered to allow full access to the other image one piece at a time.

As will also become apparent, the use of segment memory address mappers 70 and limited port access configuration of the PEs 16 and shared memory modules 14 allow system 10 to be partitioned into multiple logical systems. Separate PEs 16 may have access to separate global address space that appears as the same PE address space.

Figure 8:
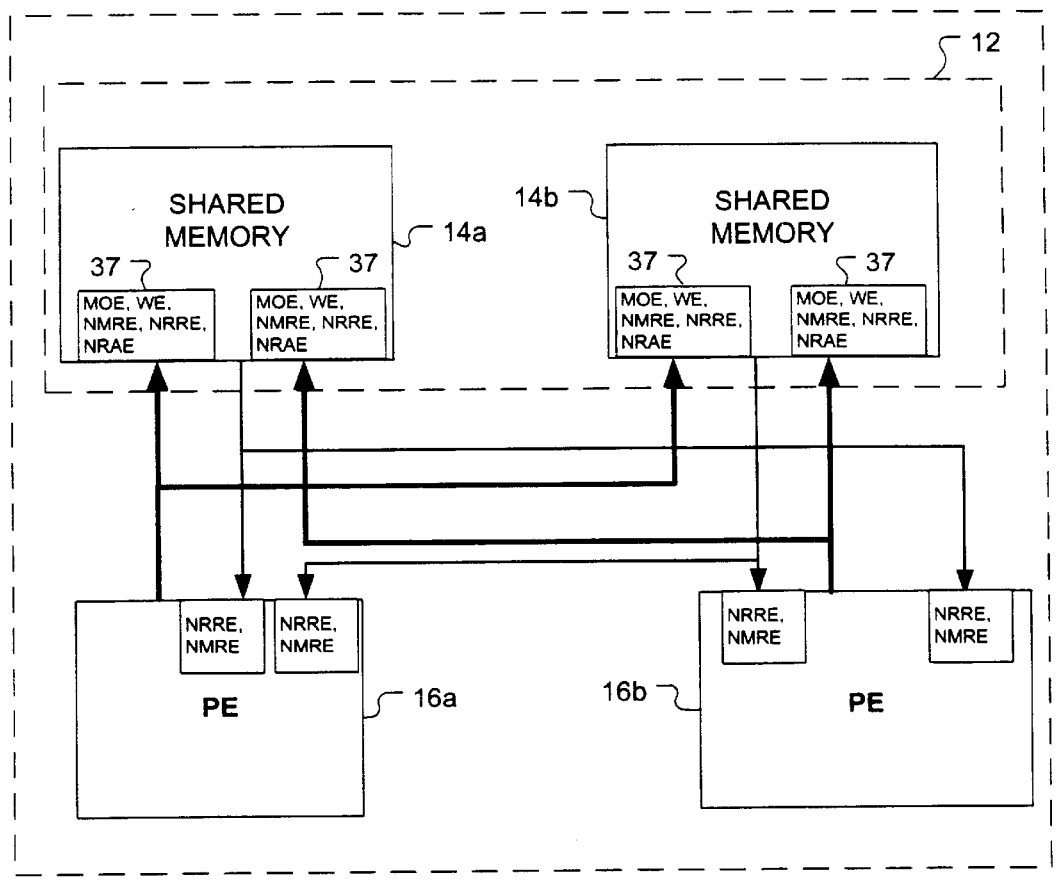
FIGS. 8–13 illustrate the partitioning of a computing system exemplary of the present invention, into two logical systems.
Figure 9:
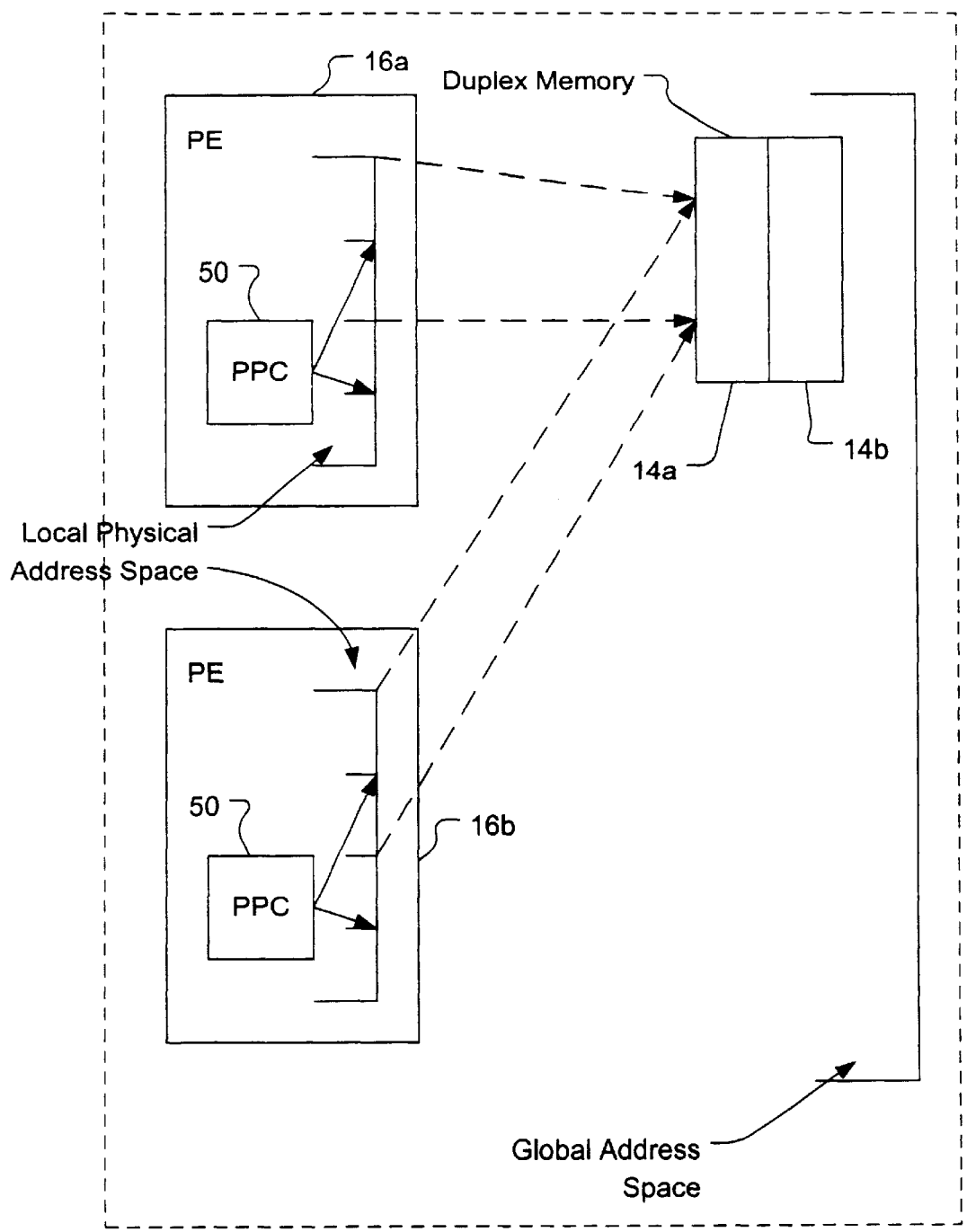

In operation, system 10 may initially be functioning as a single logical system, as illustrated in FIGS. 8 and 9. For simplicity, the system of FIGS. 8 and 9 has only been illustrated with two PEs 16a and 16b and two shared memory modules 14a and 14b. Memory modules 14a and 14b are preprogrammed to span the entire address space required by processors 52 (FIG. 3) of PEs 16. Shared memory 12 is configured so that for each shared memory module 14a, another shared memory module 14b provides redundant storage. Accordingly, example system 10 as illustrated is initially configured to be a duplex system with 1:1 memory redundancy. Addresses required by program memory 54 are not assigned to shared memory 12. Scheduling software forming part of OS 102 (FIG. 4), causes execution of processes of application software 114 among various PEs 16. The scheduling software keeps track of tasks to be executed. The PEs 16 read and write to and from shared memory by initiating and completing read and write transactions as detailed above with reference to FIGS. 6 and 7. Only as tasks are completed are changes to shared memory 12 committed, as detailed in U.S. patent application Ser. No. 08/774,548.

Initially, each receive port of each shared memory module 14a and 14b interconnected with PEs 16a and 16b is configured to assume MOE, WE, NRRE, NRAE and NMRE states and associated access to the memory module by all interconnected PEs as illustrated in FIG. 8. Each port of PEs 16a and 16b has assumed states NRRE and NRAE. Thus, both, PEs 16a and 16b may read and write to memory locations and registers within memory modules 14a and 14b. Similarly, PEs 16a and 16b may read and write to and from each other's registers. Moreover, as read and write transactions are performed, memory is preferably "owned" by processes performing on PEs 16a and 16b, as detailed in U.S. patent application Ser. No. 08/774,548. As noted, both memory modules 14a and 14b are operating in redundancy spanning identical global address space. That is, shared memory interfaces 36 of both modules are programmed to respond to identical address requests. This is illustrated schematically in FIG. 9.

Figure 10:
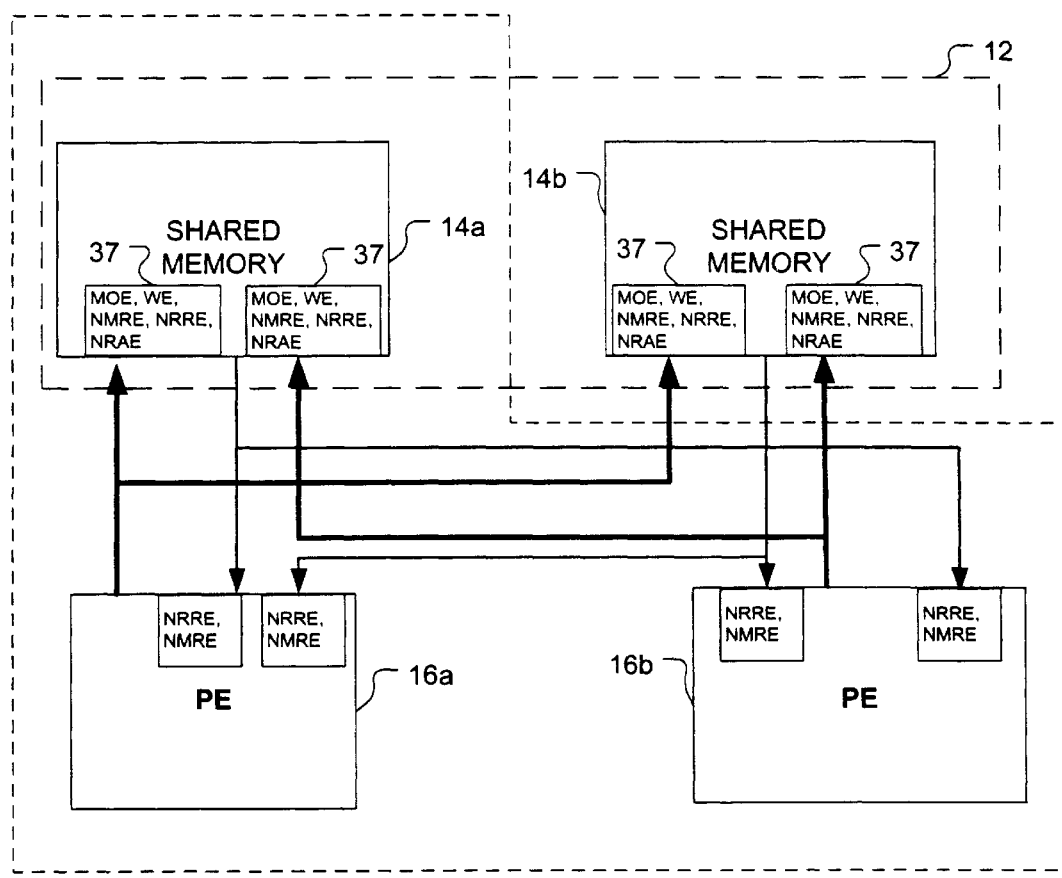
Figure 11:
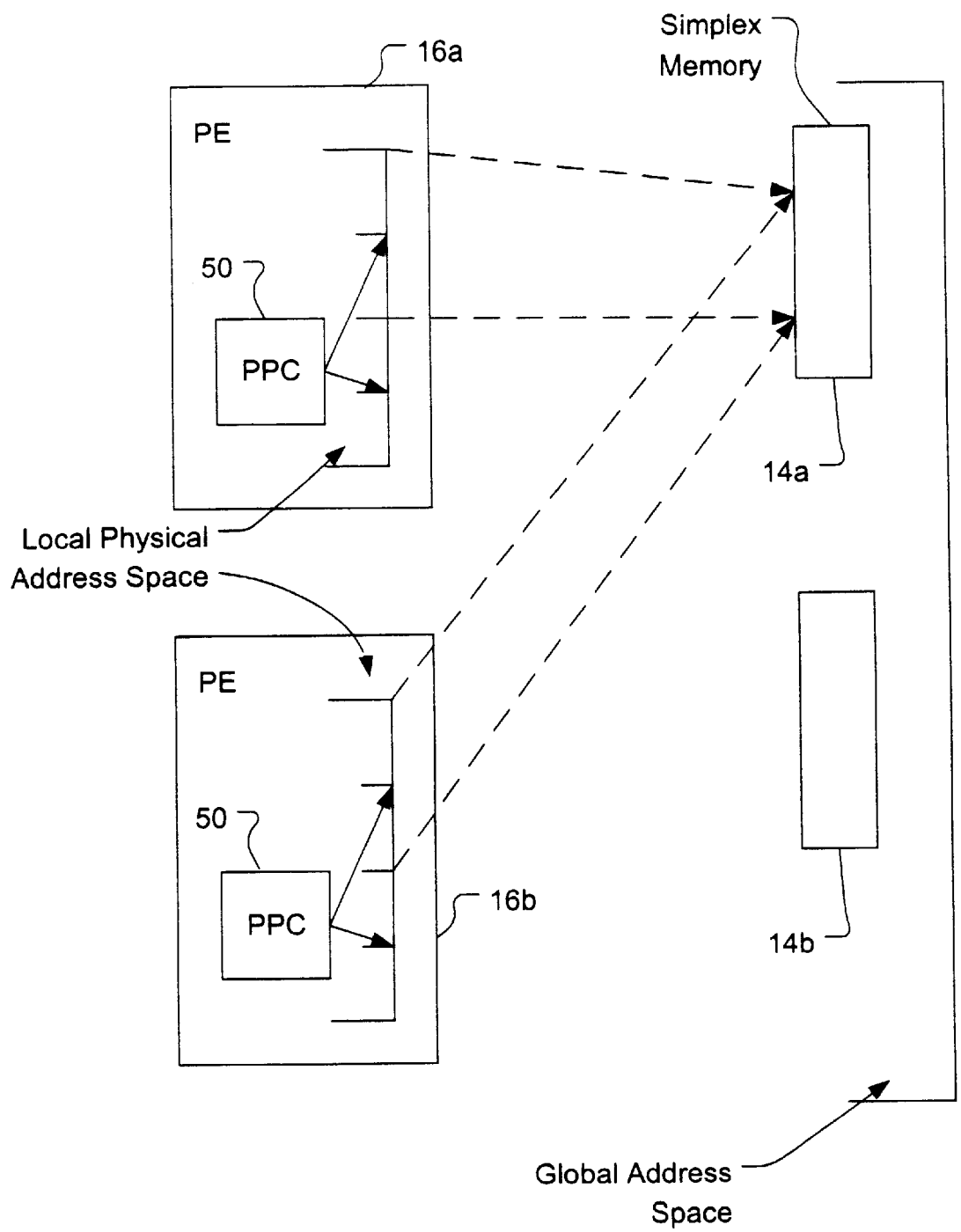

Now, assume that a software upgrade to system 10 is to be performed. Maintenance software 104 re-programs shared memory interface 36 of one of the memory modules 14b, by modifying appropriate registers of the memory module. As illustrated in FIGS. 10 and 11, shared memory interface 36 (FIG. 2) of module

14b is reprogrammed so that module 14b spans contiguous addresses within the global memory address space, different from the address space spanned by memory module 14a, as best illustrated in FIG. 11. PEs 16a and 16b are not yet reconfigured, and accordingly continue to access address space spanned by memory module 14a. At this point, shared memory module 14a is no longer operating in redundancy, as memory module 14b occupies a different address space. Clearly, in the absence of memory redundancy the likelihood of a memory failure impacting system 10 is increased. As such, the time the system is used in this configuration should be minimized.

Figure 12:
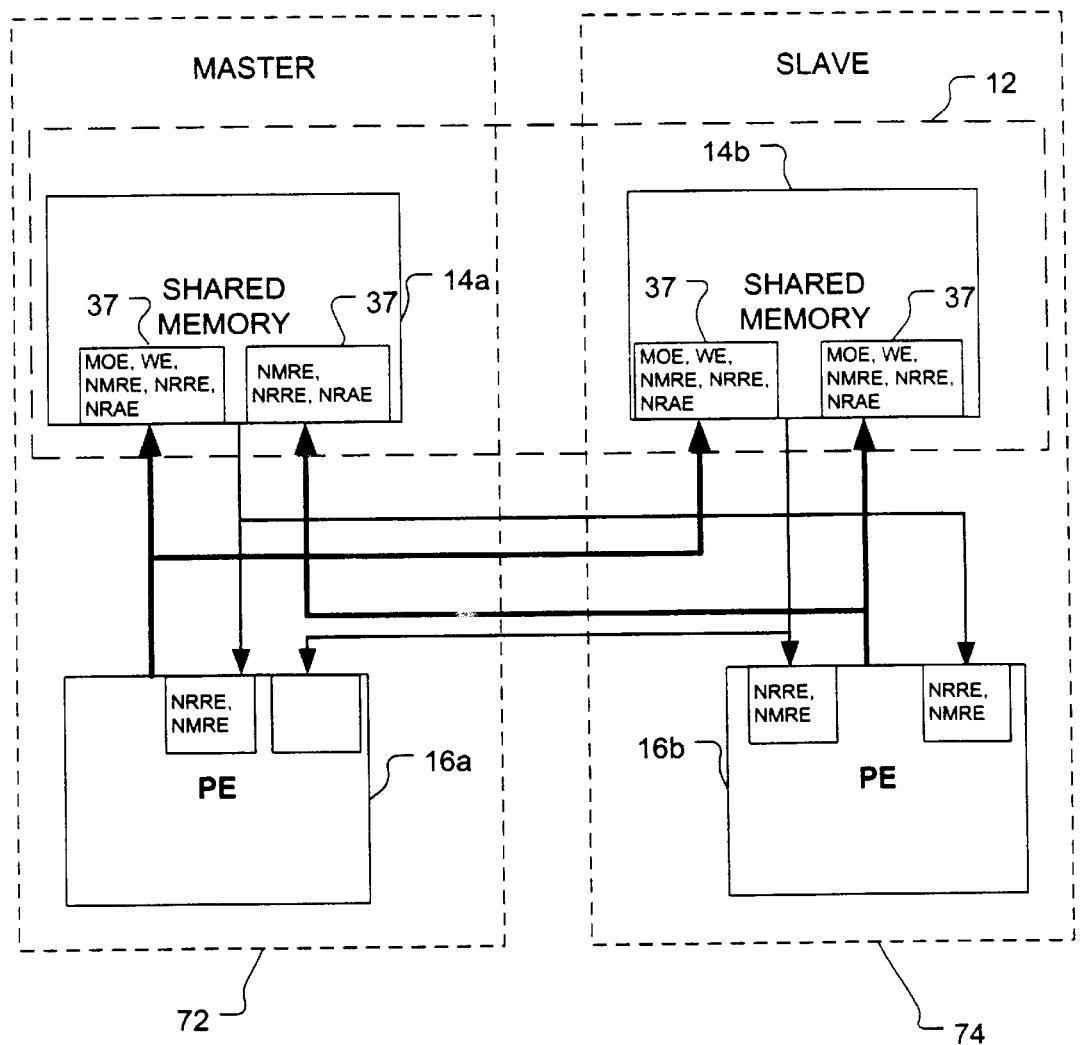
Figure 13:
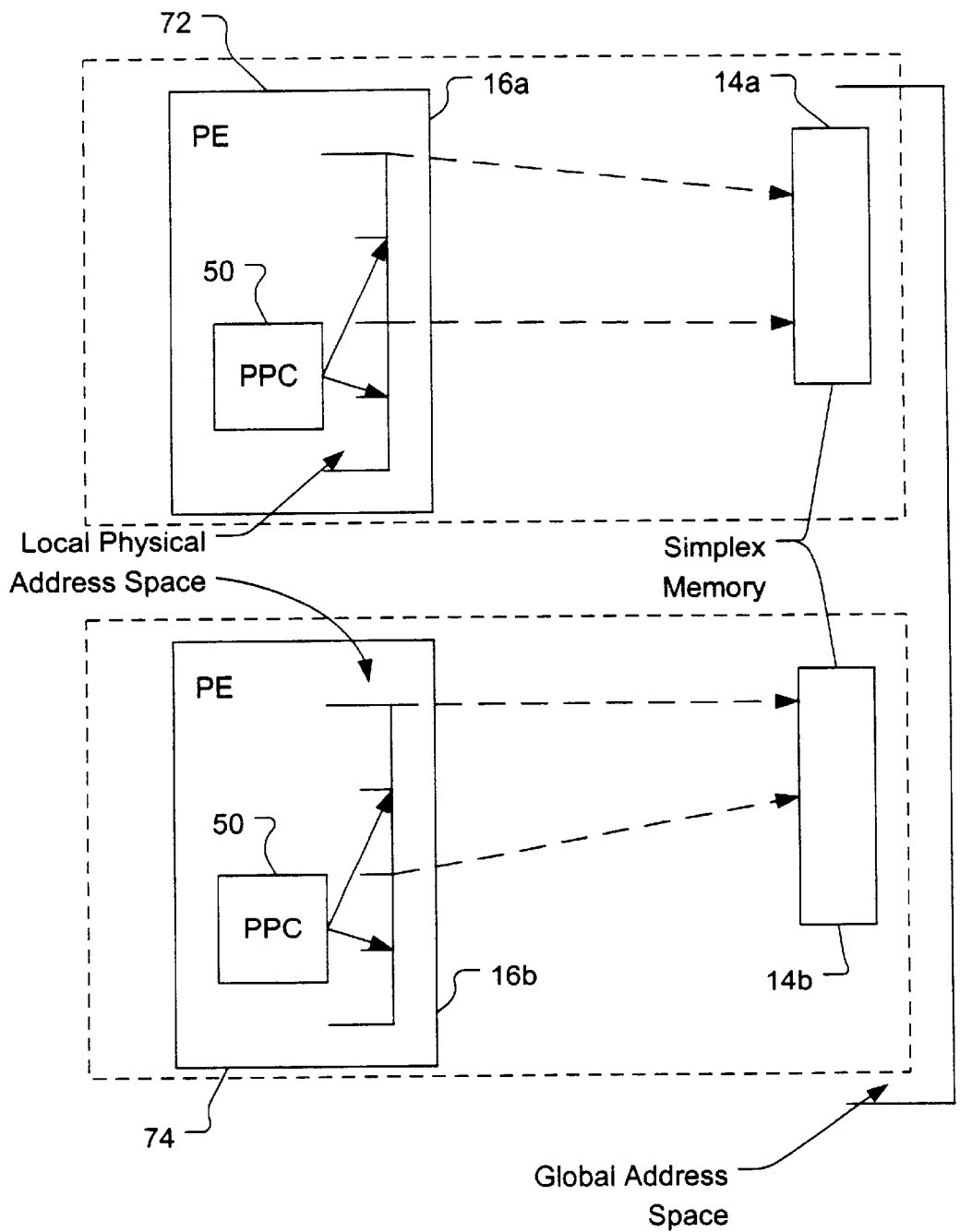

PEs 16b and memory module 14b are now used to form a logical "slave" system 74 that is physically part of system 10, as best illustrated in FIGS. 12 and 13. The remaining PE 16a executing application software 114 and maintenance software 104 and memory module 14a form a logical "master" system 72, within physical system 10, that continue execution of software tasks for system 10. Logical "master" system 72 is referred to as the "master" system, because operating system and maintenance software 102 and 104 associated with this system retain ultimate control over both logical and "slave" and "master" systems 74 and 72. In contrast, "slave" system 74 has no control over "master" system 72.

Shared memory interface 36 of memory module 14a is thus directed to modify read ports 37 of memory module 14a by maintenance software 104 of "master" system 72 to allow only NMRE and WE access to PEs 16a, forming part of the "master" system, as best illustrated in FIG. 11.

Now, a new software load by "slave" system 74 is initiated by the "master" system 72 from, for example, one of IOPs 18 (FIG. 1) into memory module 14b, and more particularly, the global address space now occupied by memory module 14b. As this address space is otherwise not used by "master" system 72, this software load has no effect on operation the "master" system 72.

As well, in order to facilitate a new software load, maintenance software 104 no longer utilizes PE 16b to handle execution of application software for the system 10. Tasks are simply no longer scheduled for execution of PE 16b.

Next, maintenance software 104 of the "master" system 72 directs PE 16b of the "slave" system 74 to access global address space occupied by the "slave" memory module 16b, as illustrated in FIG. 13. Specifically, maintenance software 104 of the "master" system directs segment memory address mapper 70 (FIG. 7) of the processor system interface 60 of the "slave" PE 16b to access the address space now spanned by the "slave" memory module 14b.

At the same time, the receive port interconnecting "master" PE 16a to "slave" memory module 14b is directed by software 104 of "master" system 72 to assume no access state as illustrated in FIG. 12. This severely limits access to "master" PE 16a by "slave" memory module 14b, and "slave" PE 16b. Responses from memory module 14b are ignored at PE 16a, while register requests from module 16a are ignored.

Port 37 of "master" memory module 14a interconnected with "slave" PE 16b assume NMRE, NRRE, NRAE states allowing read access to registers of shared memory module 14a, and read access, without ownership, of memory by "slave" PE 16b.

The port interconnecting "master" PE 16a to shared memory module 14b continue to allow full access by PE 16a to "slave" shared memory module 14b. Similarly, the port interconnecting "slave" PE 16b to "slave" shared memory module 14b continues to allow full access by PE 16b to "slave" shared memory module 14b.

At this point, "slave" PE 16b is initialized allowing program load now stored within "slave" shared memory module 16b to execute, giving it access to address space spanned by spare PEs 14b. Upon initializing, the processor 52 may load the newly loaded software into RAM 54 of PE 14b.

As should now be appreciated, the configuration of receive ports of shared memory interfaces 36 of shared memory modules 14 and addressing has created two logically distinct computing systems: a "master" system and a "slave" system 74, as depicted schematically in FIGS. 12 and 13. For control purposes, the "master" system retains the ability to read and write from and to the memory and registers of the "slave" system 74. However, "slave" system 74 is only able to read from the memory, without ownership and the registers of the "master" system.

Under software control of the "master" system, (i.e. updated maintenance software 104) maintenance software "slave" system 74, may now load operating data from shared memory 14a of "master" system 72 into its own shared memory 14b without affecting the state of the "master" system, as the "slave" PE 16b has read access without ownership to the memory of the "master" system, thereby transferring the operating state of "master" system 72 to "slave" system 74. Once the state of "master" system 72 has been loaded into shared memory of the "slave" system 74, maintenance software of the "master" system can relinquish control and allow "slave" system 74 to assume the role of the "master" system.

Data may be exchanged between system 74 and 72 by pre-loading the fifteenth segment registers of PE 16b of slave system 74 with a segment address identifying a global address occupied by shared memory 14a of master system 72. This may be effected by having operating system/maintenance software of "slave" system 74 send a message received by operating system/maintenance software of "master" system 72 indicating data should be transferred.

When the PE 16b of "slave" system 74 notes the flag being set, it reads the message, performs the necessary action and then sets flags in its own buffer to indicate that data has been received and transferred from the "master" system 72. The pointers are used to reset the window of the inactive image to the location of the data in the active image so that it may be accessed, converted to a new format, and placed in the memory of the slave system.

Alternatively, data need not be transferred between the systems and both "master" and "slave" systems 72 and 74 may operate simultaneously, allowing for the testing of "slave" system 74 before completion of the upgrade process.

Once control is passed to the former "slave" system 74, software of the former "master" system 72 may be upgraded in the same fashion as the "slave" system 74, now under control of the upgraded maintenance software executing at the "slave" system 74. Effectively, after control is passed to "slave" system 74, the roles of logical systems 72 and 74 are reversed: the new "master" (former "slave") system 74 passes a message to the former "master" system 72, which causes maintenance software on system 72 to adjust port restrictions to allow full access to system 72, as illustrated in FIGS. 8 and 9.

While the above example embodiment has described the division of physical system 10 into two distinct logical systems, it will be appreciated that the port and memory structure associated with the various shared memory modules 14a to 14n allows for the logical partitioning of system 10 into many logical subsystems, each of which could be under control of a single logical "master" system.

Moreover, while the above embodiment has been described as comprising numerous ASICs, it will be appreciated that conventional computer hardware devices could be replace one or more of the custom developed ASICs. Moreover, while a specific point-to-multipoint interconnect has been described, it will be appreciated that the described system could easily be modified to include a transaction bus, a token ring or ethernet interconnections. Similar, while PEs 16 and memory modules 14 have been described as physically separate, similar modular entities could be formed on a single physical assembly.

It will be understood that the invention is not limited to the illustrations described herein which are merely illustrative of a preferred embodiment of carrying out the invention, and which are susceptible to modification of form, size, arrangement of parts and details of operation. The invention, rather, is intended to encompass all such modification within its spirit and scope, as defined by the claims.

What is claimed is:

1. In a multi-processor computing system comprising first and second processing elements and first and second memory elements interconnected with said processing elements, said first and second memory elements configurable to occupy first and second memory address spaces within a global address space, respectively, each of said first and second processing elements configurable to use an address space that is a subset of said global address space, a method of operating two logical computing systems, comprising:

a. configuring said first memory element to occupy an address space within said global address space used by said first processing element;

b. configuring said second memory element to occupy an address space within said global address space not used by said first processing element;

c. configuring said second processing element to use said second address space, and thus said second memory element; and d. preventing write access to said first memory element by said second processing element, e. loading executable software into said second address space, used by said second processing element;

f. executing said executable software on said second processing element;

thereby creating first and second logical computing systems within said multi-processor computing system.

2. The method of claim 1, further comprising:

g. loading operating parameters for said executable software from said first memory element to said second memory element.

3. The method of claim 2, further comprising:

h. notifying said first processing element that said executable software is executing on said second processing element.

4. The method of claim 2, wherein said loading is performed by said second processing element, under control of said first processing element.

5. The method of claim 1, wherein a. to d. are performed by said first processing element under software control.

6. A multi-processor computing system comprising:

first and second processing elements, each processing element capable of accessing memory at processing element memory addresses;

first and second memory elements having a plurality of alterable memory units, each memory unit identified by a system memory address within a defined address space;

a memory element interface in communication with each of said first and second memory elements permitting alteration of its defined address space;

an address mapper interconnected between each of said processing elements and at least one of said memory elements, each said address mapper capable of mapping a processing element memory address to a system memory address within a defined address space;

each of said first and second memory elements comprising an associated port having a first state permitting alteration of memory units of that memory element through its associated port, and a second state preventing alteration of memory units of that memory element through its associated port;

each of said first and second processing elements connected to each of said first and second memory elements, through an associated one of said ports.

7. The system of claim 6, wherein said first and second memory elements are configurable to span different address spaces and wherein said first and second processing elements are configurable to have limited access to said second and first memory elements, respectively.

8. The system of claim 7, wherein said second processing element is configured to have only read access to said first memory element.

9. The system of claim 6, wherein said memory element interface is configurable so that said first and second memory elements occupy identical address spaces.

10. A multi-processor computing system comprising:

first and second memory elements each comprising alterable memory units;

first and second processing elements interconnected with each of said first and second memory elements to read and write from said memory elements;

each memory element comprising:
means to select an address space within a system address space, used by said each memory element; and
means to limit access to said each memory element by each of said first and second processing elements means for mapping, interconnected between said first and second processing elements and at least one of said first and second memory elements, said means for mapping capable of mapping a processing element memory address to a system memory address, said means for mapping programmable to select a predefined subset of said system memory address space to be used by a given one of said first and second processing elements as an associated processing element address space so that each memory unit may be identified within said each memory element by an address within said system address space and identified to said given one of said first and second processing elements by an address within said associated processing element address space.

11. A multi-processor computing system comprising:

a plurality of processing elements, each capable of accessing memory only within its associated processing element address space;

memory having a plurality of alterable memory units, each memory unit identified by a system memory address within a defined global memory address space;

an address mapper interconnected between each of said processing elements and said memory units, said address mapper capable of mapping a processing element memory address to a global memory address, said address mapper programmable to select a predefined subset of said memory units within said global memory address space to be used by a given one of said processing elements as an associated processing element address space, each memory unit within said subset identified within said memory by an address within said global memory address space, and identified to said given one of said processing elements by an address within said associated processing element address space.

12. The system of claim 11, wherein said memory comprises a plurality of memory elements each spanning a memory element address space that is a portion of said global address space, said system further comprising a memory element interface in communication with each of said memory elements permitting alteration of its memory element address space within said global address space.

13. The system of claim 12, wherein said memory element interface is configurable so that two memory elements can occupy identical memory element address spaces within said global address space.

14. The system of claim 12, wherein each of said processing elements is configurable to have limited access to selected ones of said plurality of memory elements.

15. The system of claim 12, wherein each of said processing elements is configurable to have read-only access to selected ones of said plurality of memory elements.

* * * * *